Figure 1:
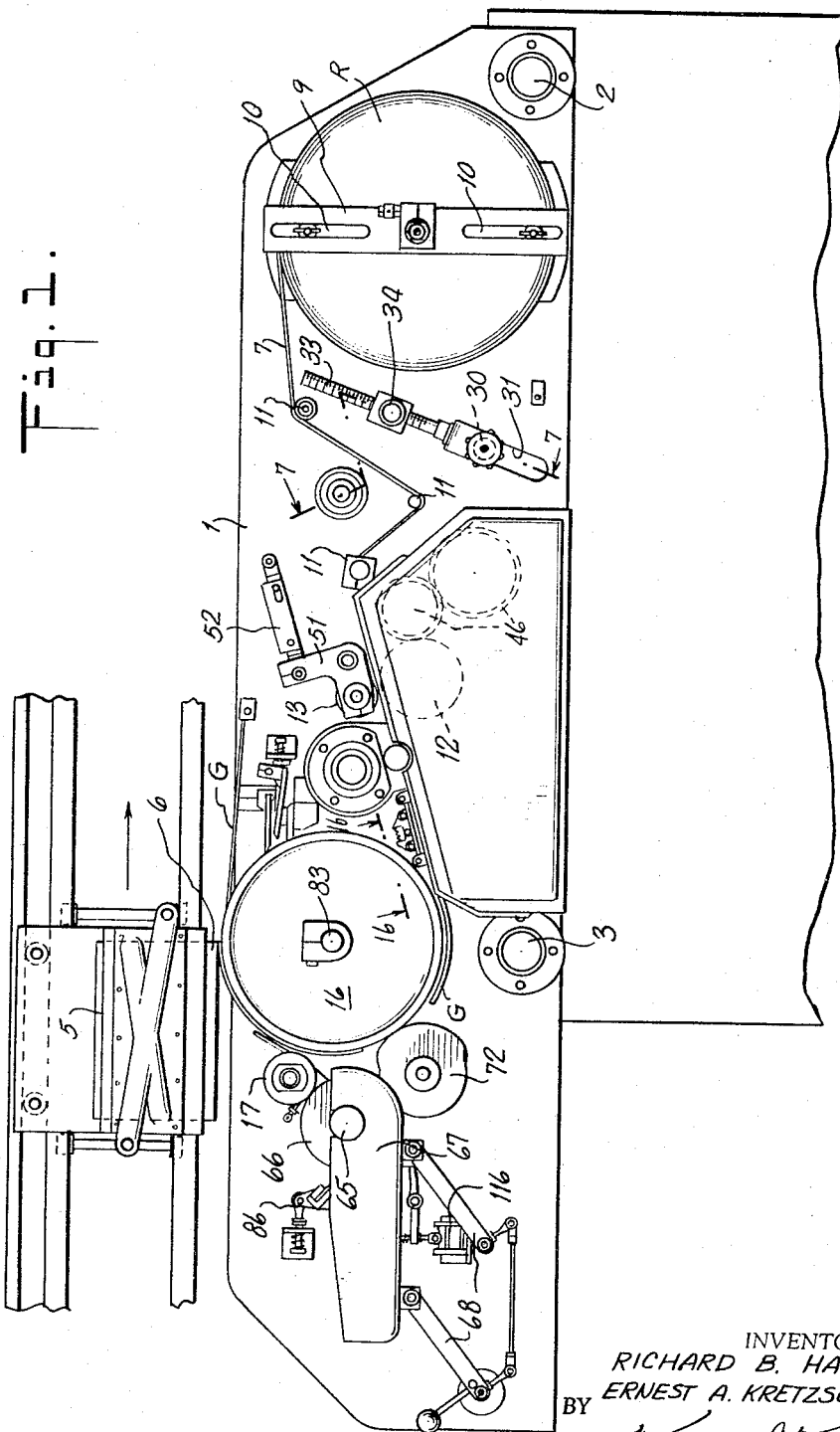

Jan. 16, 1968  R. B. HAWKES ETAL  3,364,092
STRETCH CLOTH FEEDER FOR BOOK-BINDING
Filed April 10, 1964  14 Sheets-Sheet 1

INVENTORS
RICHARD B. HAWKES
ERNEST A. KRETZSCHMER
BY
Kenyon & Kenyon
ATTORNEYS

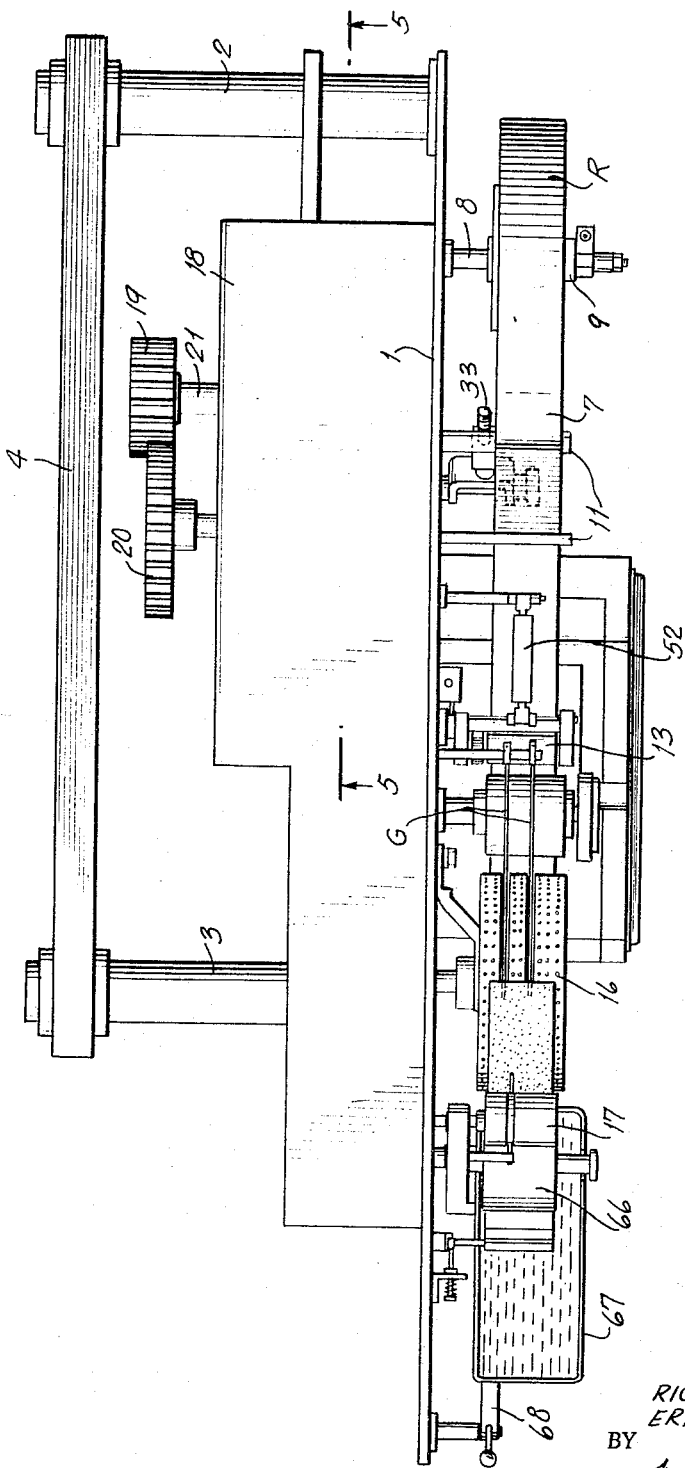

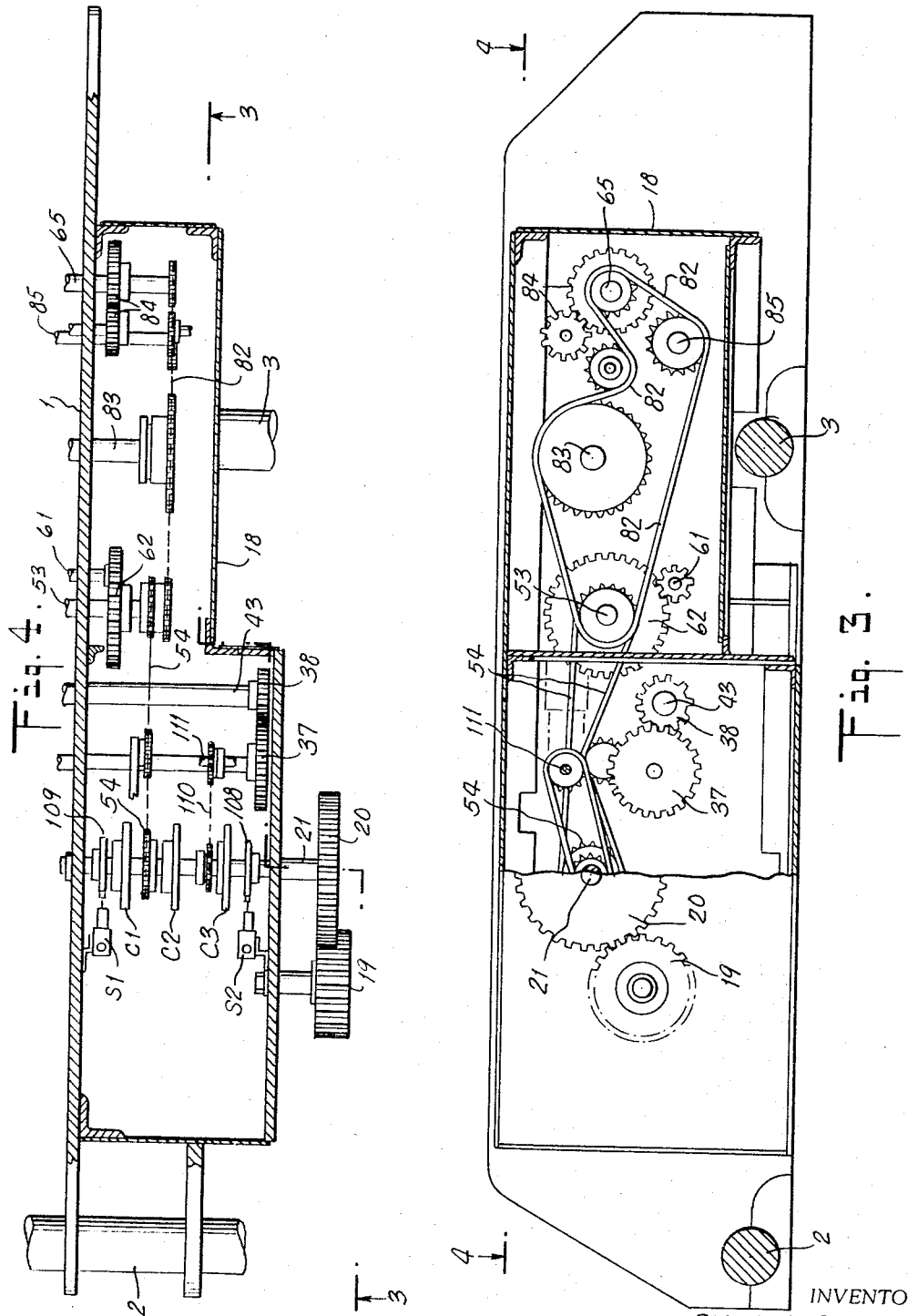

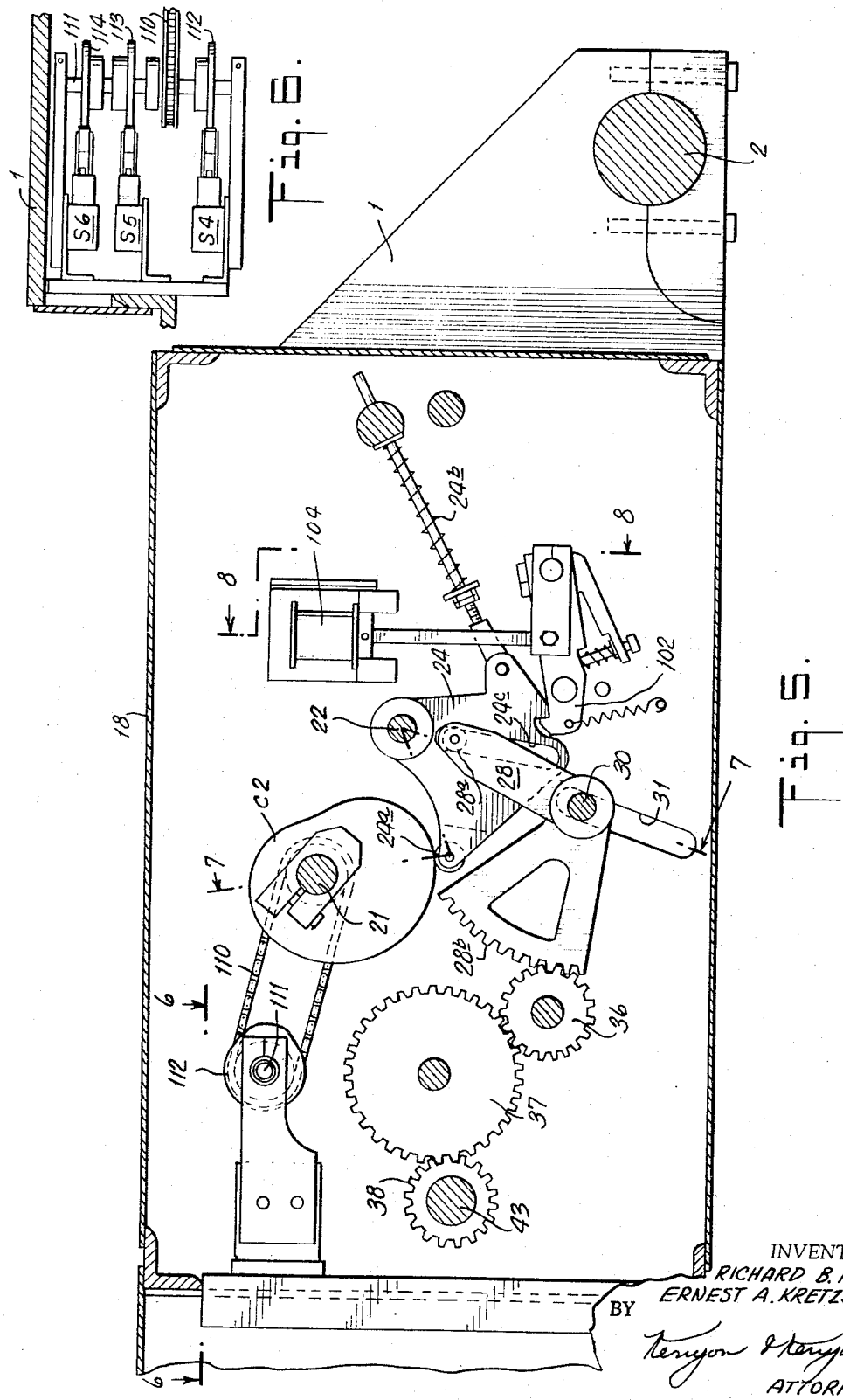

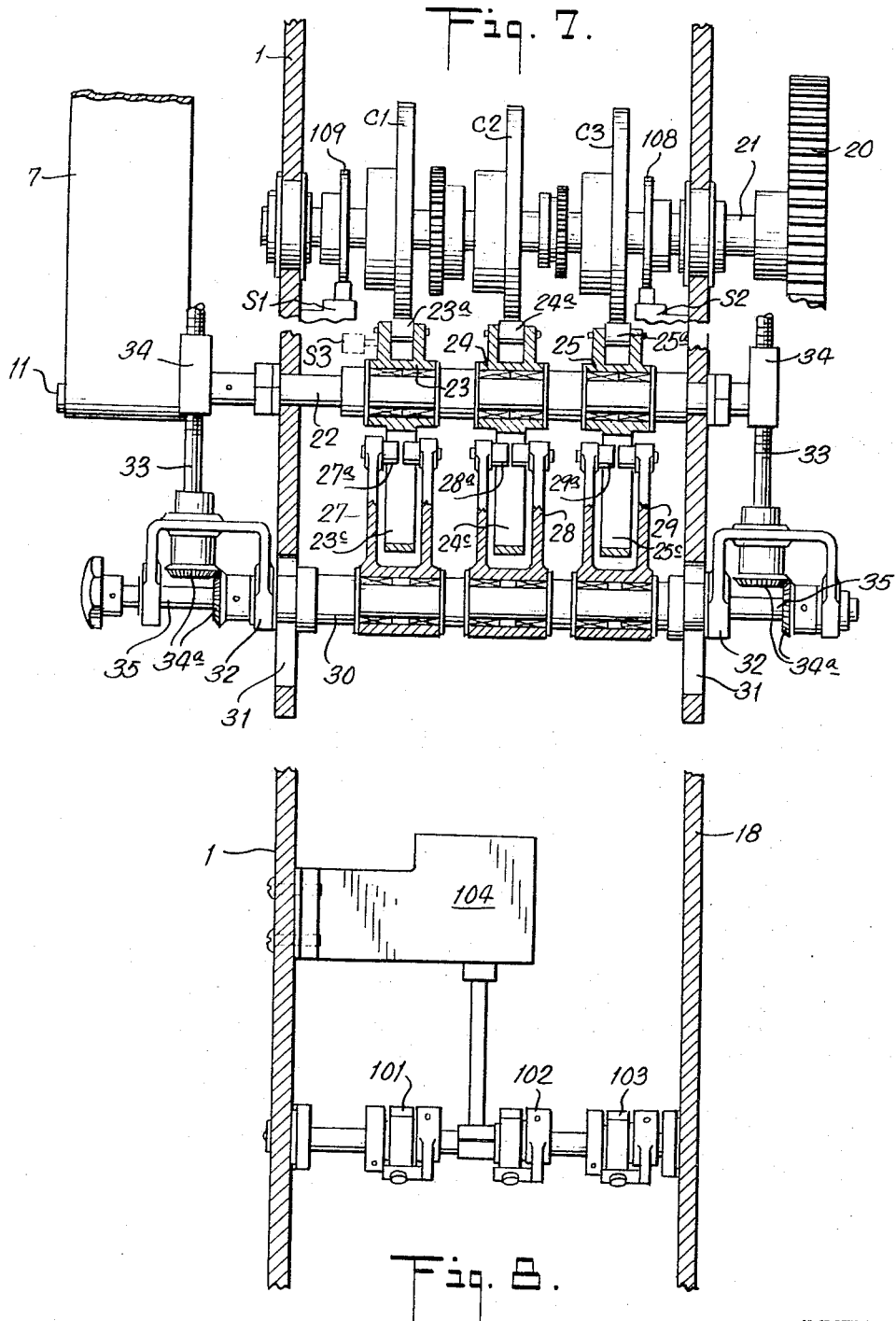

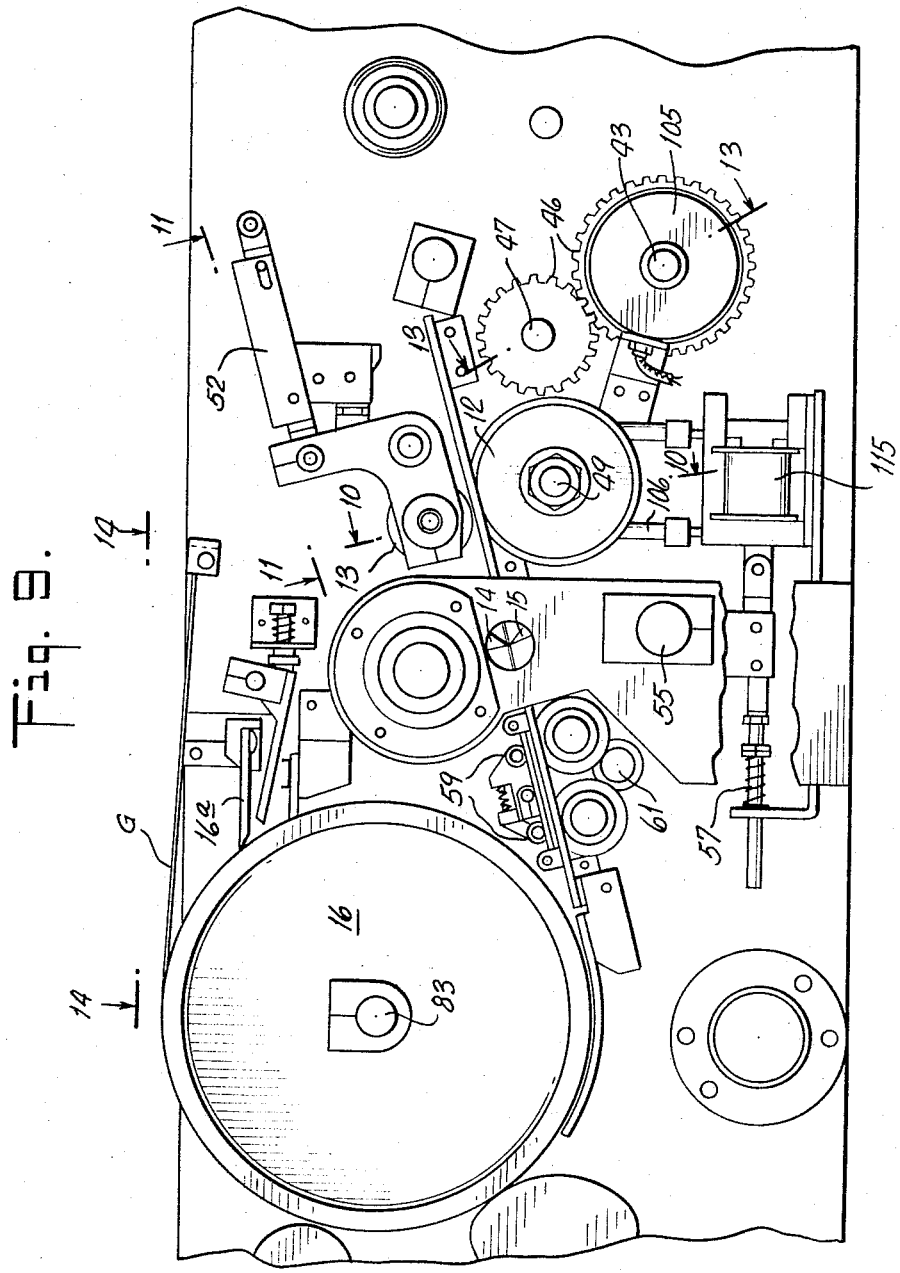

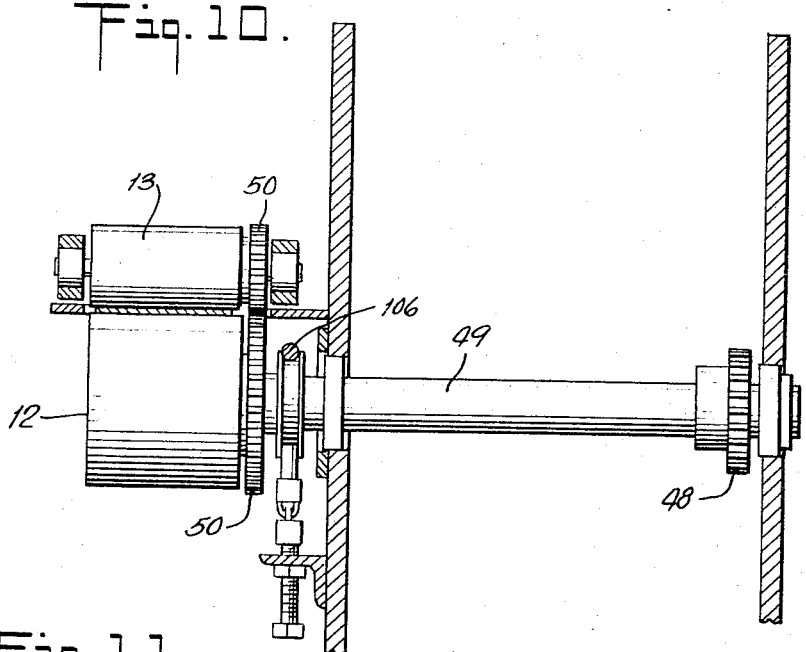
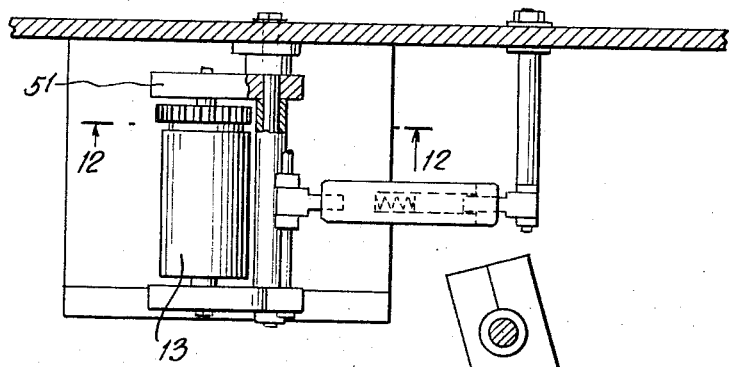
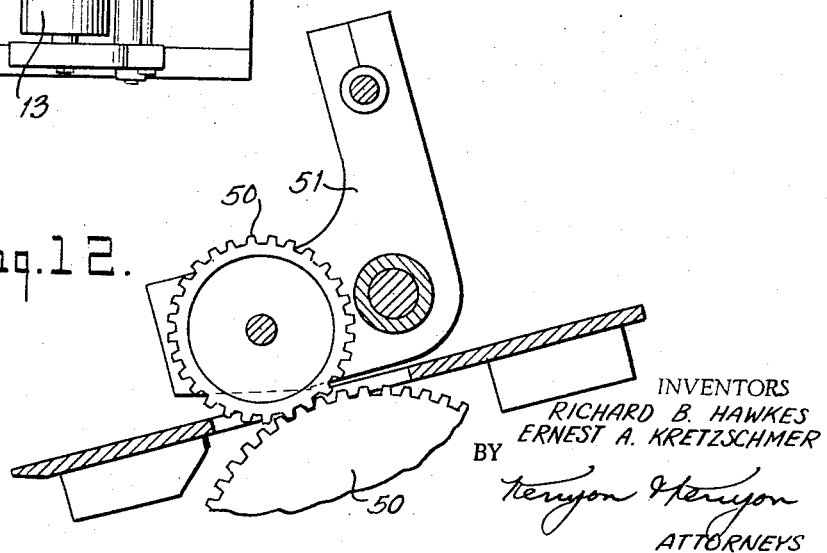

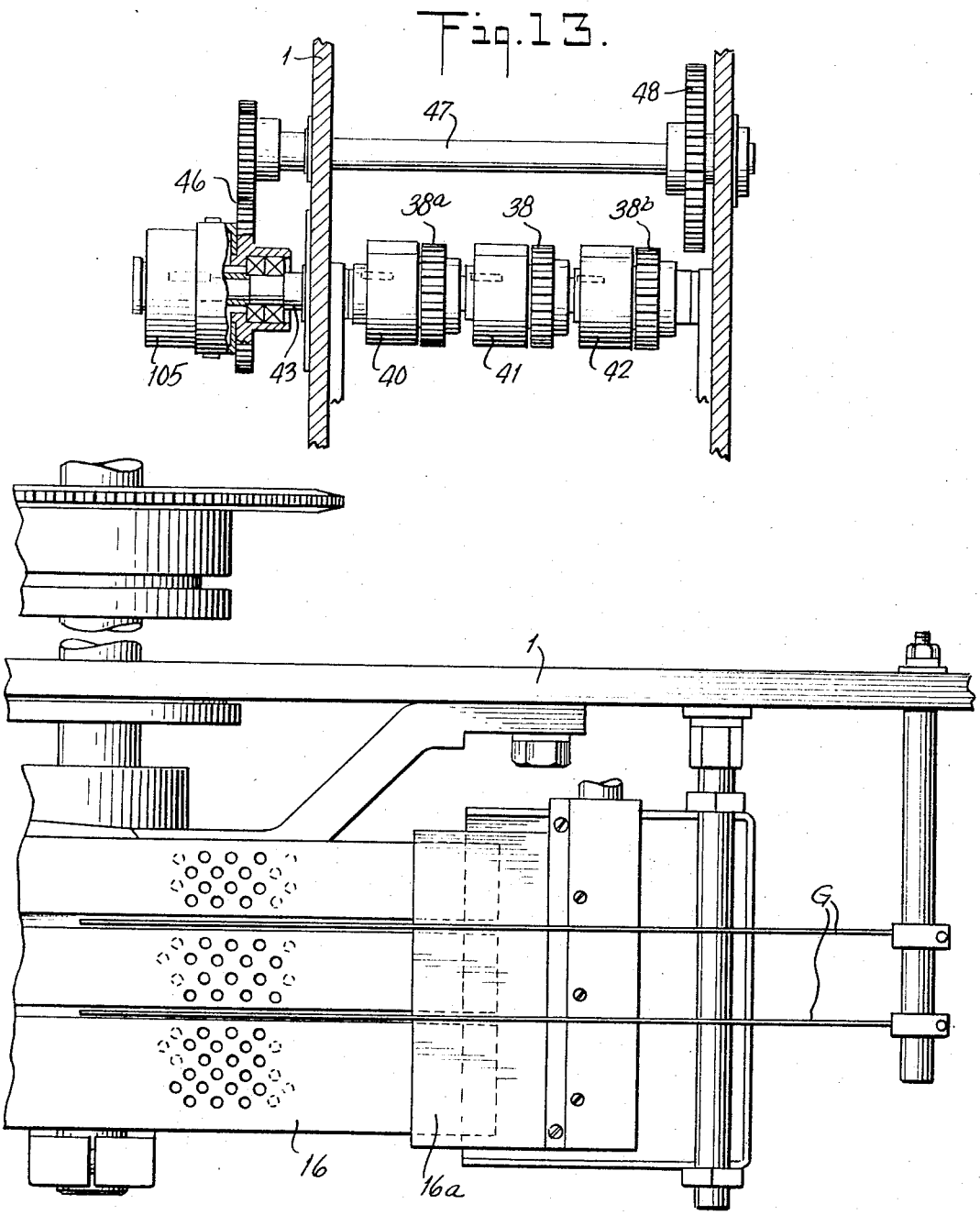

INVENTORS
RICHARD B. HAWKES
ERNEST A. KRETZSCHMER
BY
Kenyon & Kenyon
ATTORNEYS

Jan. 16, 1968     R. B. HAWKES ET AL     3,364,092
STRETCH CLOTH FEEDER FOR BOOK-BINDING
Filed April 10, 1964     14 Sheets-Sheet 10

INVENTORS
RICHARD B. HAWKES
ERNEST A. KRETZSCHMER
BY
ATTORNEYS

Jan. 16, 1968 R. B. HAWKES ET AL 3,364,092
STRETCH CLOTH FEEDER FOR BOOK-BINDING
Filed April 10, 1964
14 Sheets-Sheet 11

INVENTORS
RICHARD B. HAWKES
ERNEST A. KRETZSCHMER
BY
Kenyon & Kenyon
ATTORNEYS

Jan. 16, 1968  R. B. HAWKES ET AL  3,364,092
STRETCH CLOTH FEEDER FOR BOOK-BINDING
Filed April 10, 1964  14 Sheets-Sheet 12

INVENTORS
RICHARD B. HAWKES
ERNEST A. KRETZSCHMER
BY
Kenyon & Kenyon
ATTORNEYS

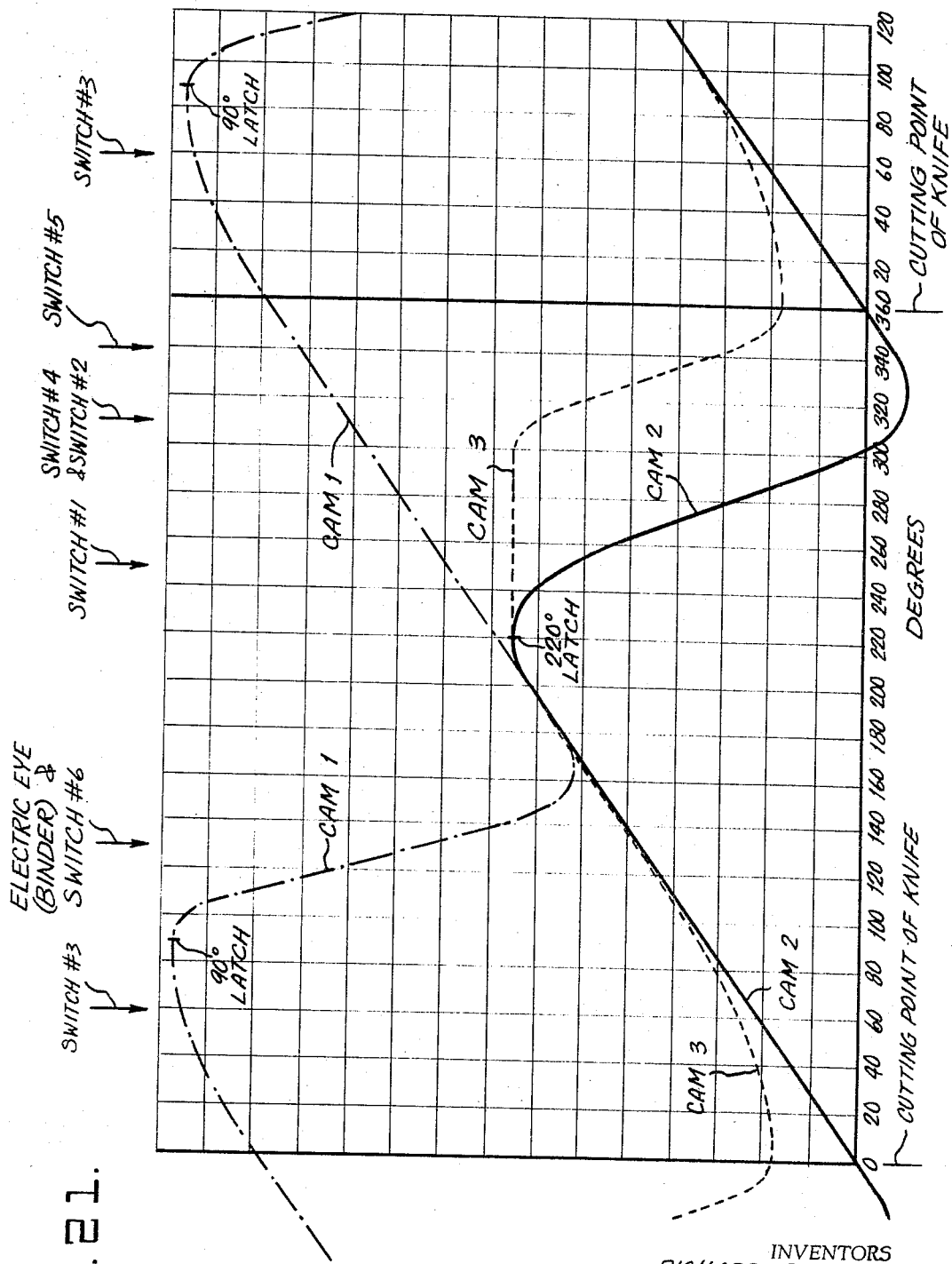

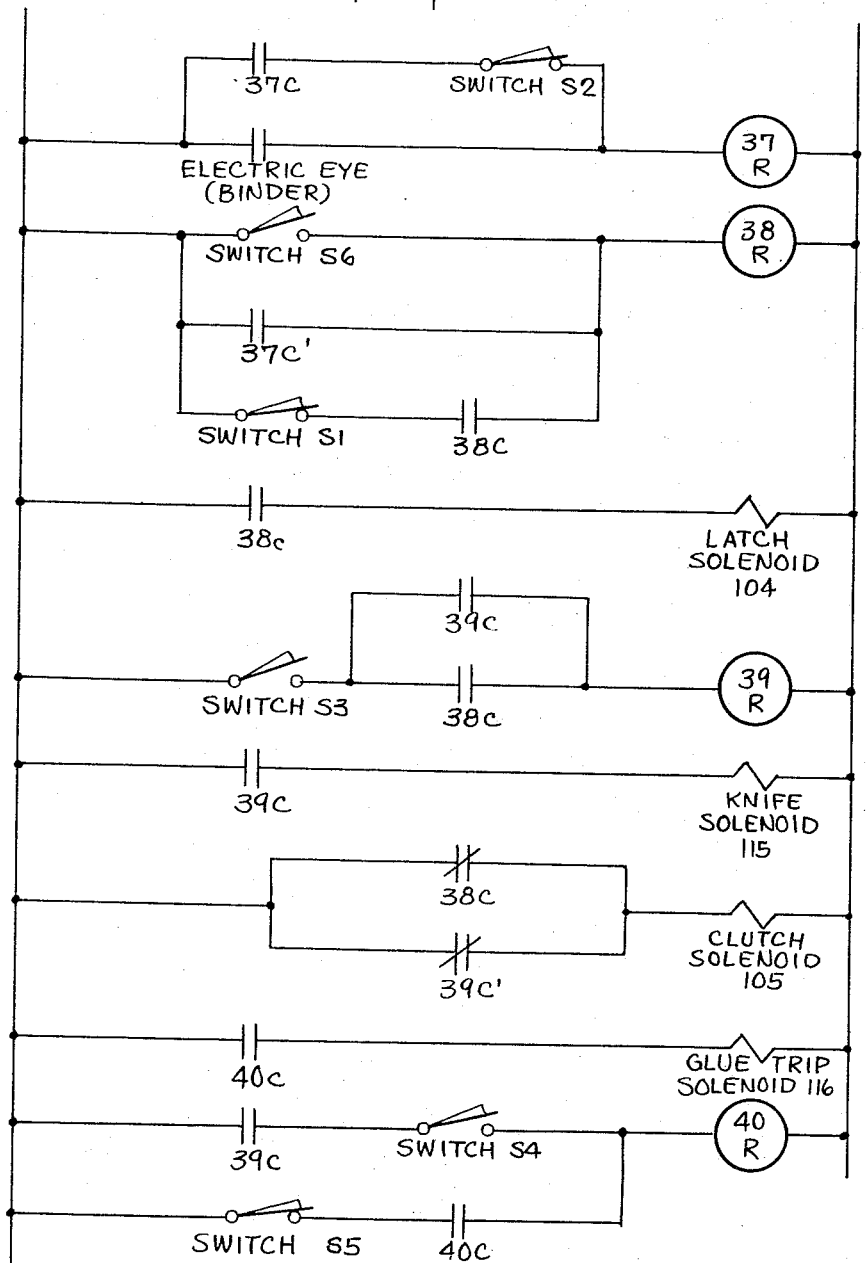

United States Patent Office 3,364,092
Patented Jan. 16, 1968

3,364,092
STRETCH CLOTH FEEDER FOR BOOK-BINDING
Richard B. Hawkes, Easton, Pa., and Ernest A. Kretzschmer, Phillipsburg, N.J., assignors, by mesne assignments, to T. W. & C. B. Sheridan Company, a corporation of New York, incorporated 1964, a wholly-owned subsidiary of Harris-Intertype Corp., New York, N.Y., a corporation of Delaware
Filed Apr. 10, 1964, Ser. No. 358,962
10 Claims. (Cl. 156—354)

This invention relates to a stretch cloth feeder for use in the book-binding art.

In one method of binding books, books are held by an endless series of book clamps with their backs facing downwardly so that the books are fed with a continuous movement horizontally while lengths of stretch cloth are adhesively secured to the books' backs. The cloth is fed from a roll and cut to lengths which are each supplied with adhesive and pressed into contact with the back of a passing book.

Typically, the series of clamps come from a preceding book binding machine, the books being ready for application of the stretch cloth and other covering elements.

The book clamps travel past the stretch cloth feeder and it is possible for books to be missing from one or more of the clamps. In such instances, the action must be stopped while the empty clamp or clamps pass, and restarted in time to apply the cloth to oncoming books when in succeeding clamps.

To obtain high-speed production, the book clamps travel at a high speed and it is necessary for the stretch cloth feeder to travel correspondingly fast. This presents a problem in connection with stopping and restarting the stretch cloth feed without breaking the cloth and so as to assure that each length is always cut to the exact length needed and fed properly to each book back as to each passing clamp holding a book.

The object of the present invention is to overcome the above problem more satisfactorily than has heretofore been possible. This demands a better way for smoothly yet rapidly decelerating and accelerating the cloth feed without loss of accuracy as to the lengths fed and cut for application to the book backs. Commercial requirements for reliability and freedom from excessive maintenance problems must be met.

The present invention achieves the above objects and has now proven to be satisfactory under commercial operating conditions. Although the principles were invented for the specific purpose of providing a machine for feeding cut lengths of stretch cloth to book backs, its principles may be applied in other fields where it is necessary to feed a succession of cut lengths of flat strip material or the like at high speed and which must be interrupted when necessary without loss of length accuracy or breakage of the material.

Figure 15:
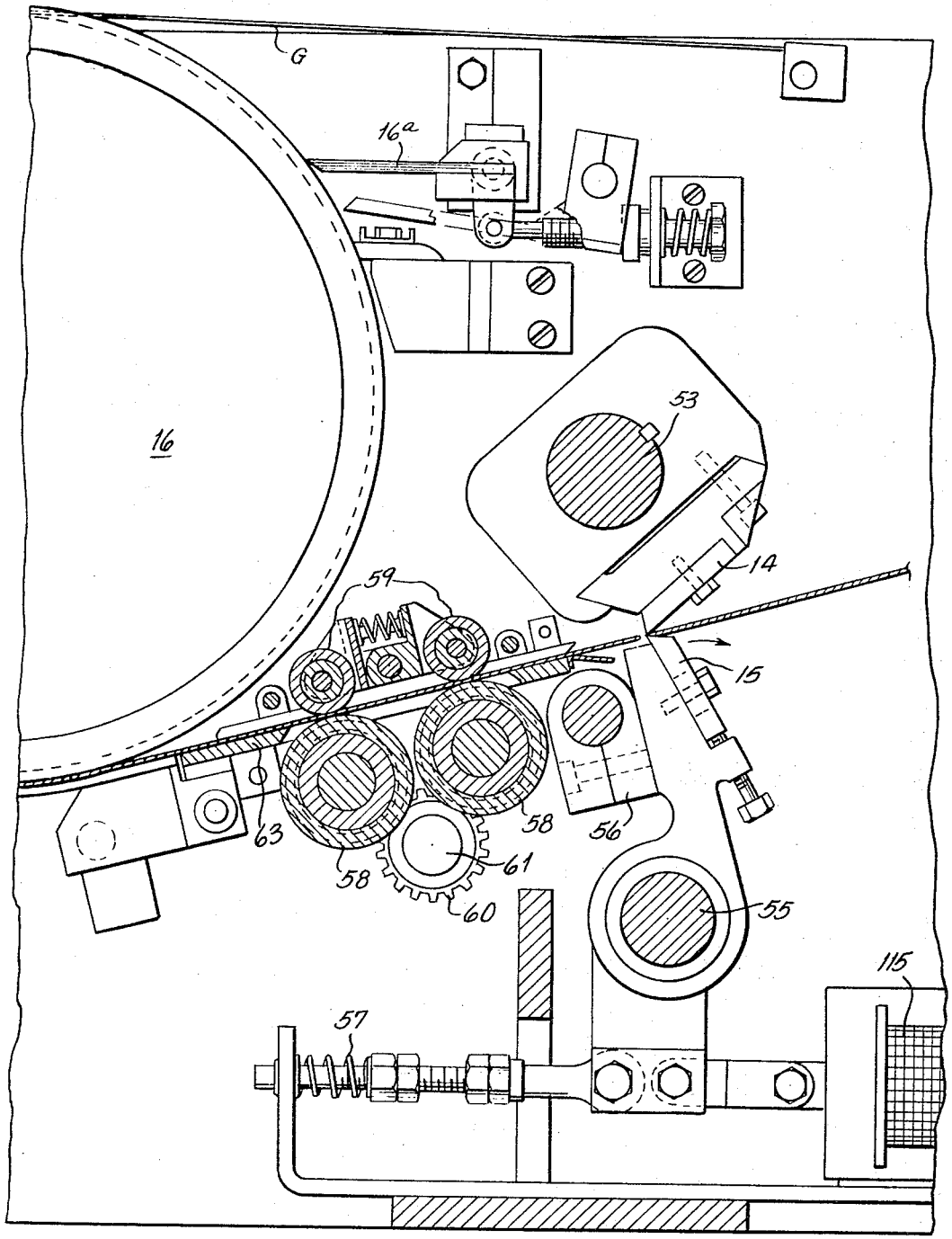
Figure 16:
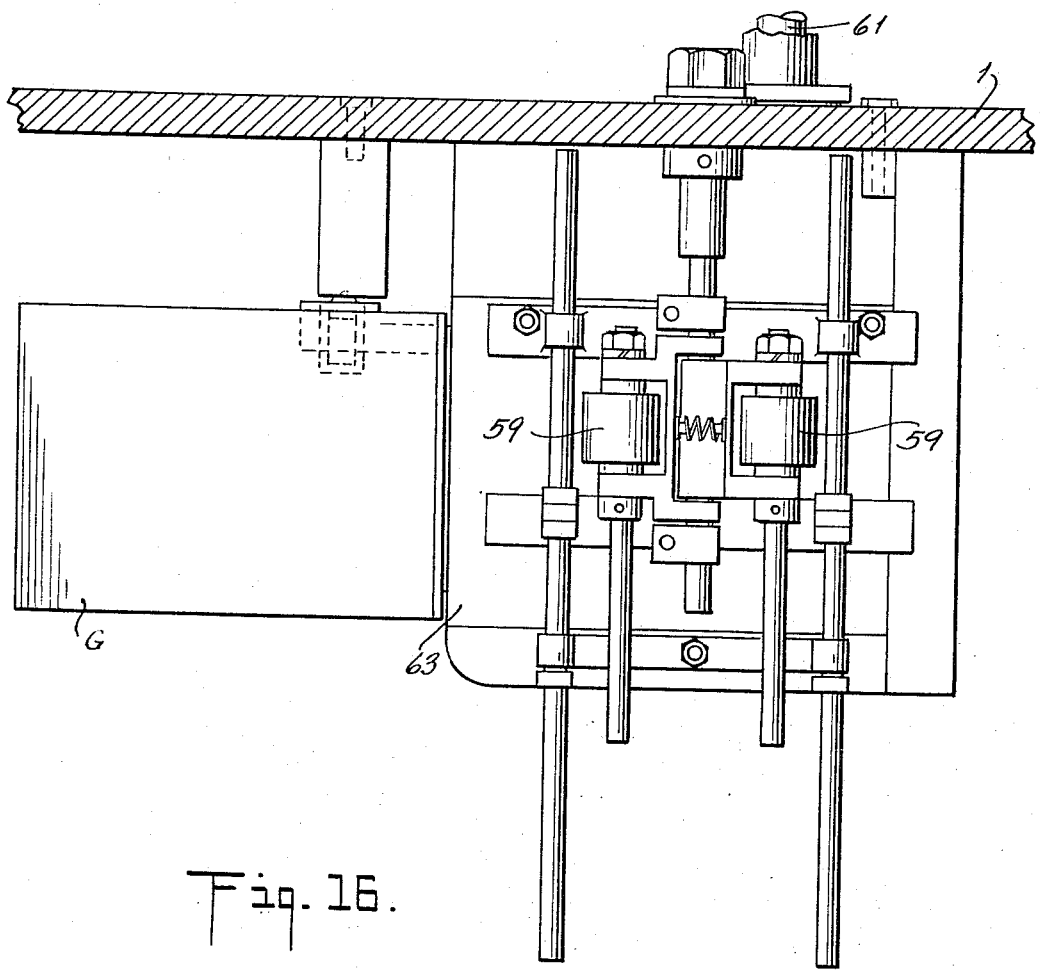
Figure 17:
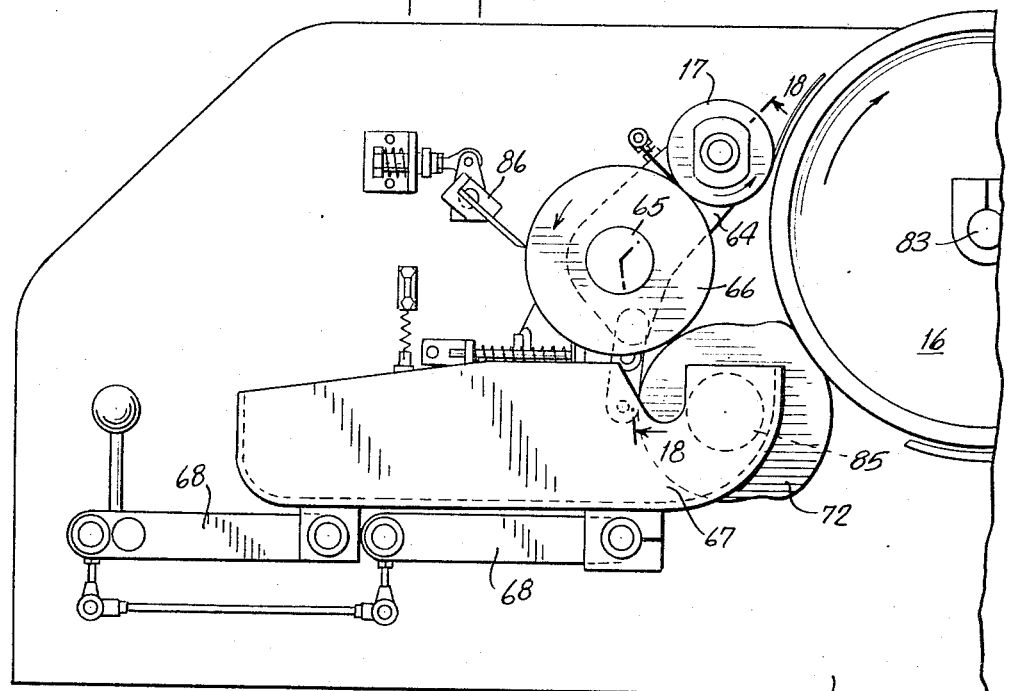
Figure 18:
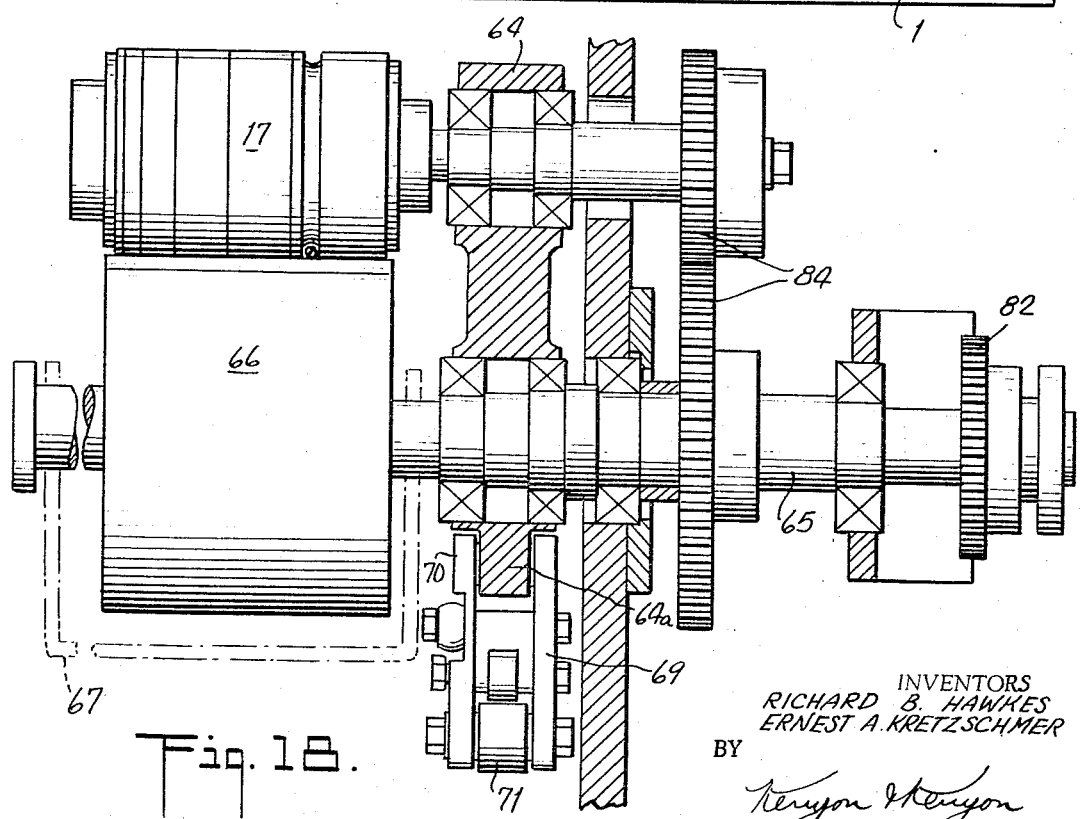
Figure 19:
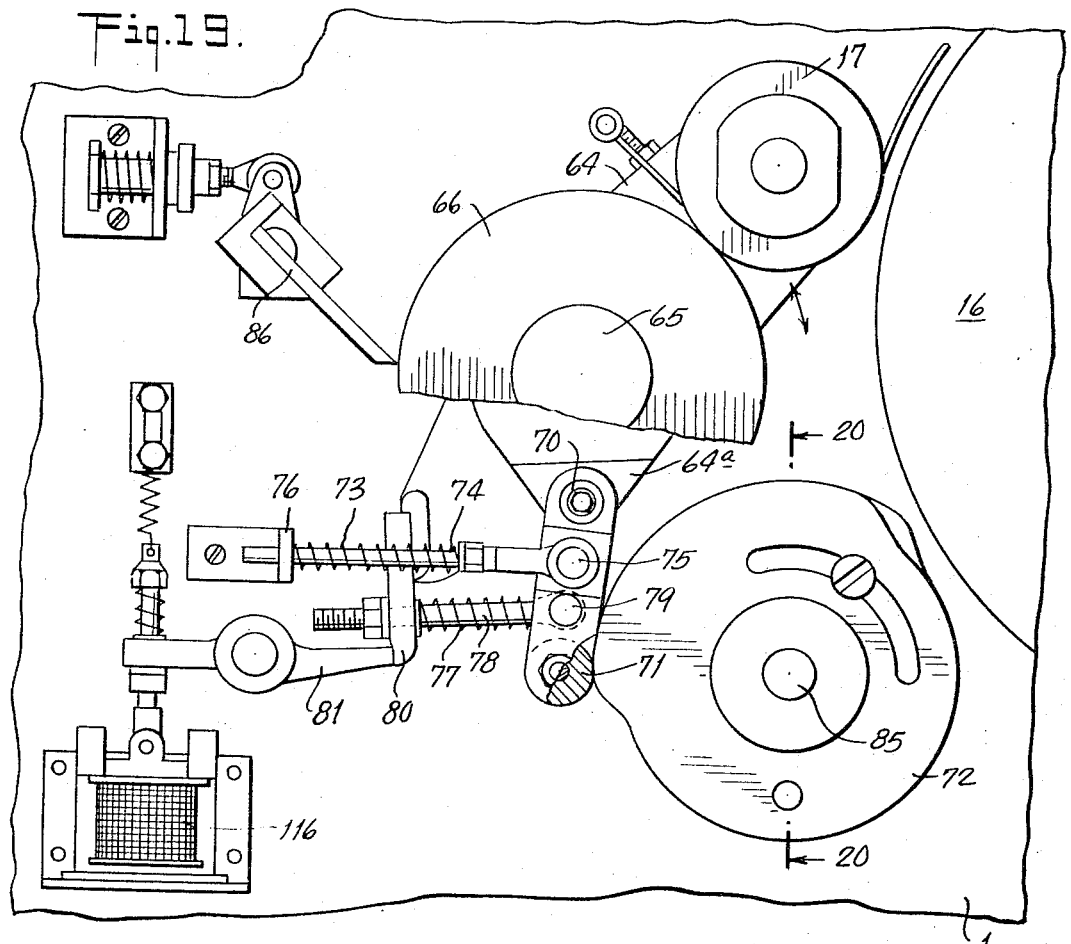
Figure 20:
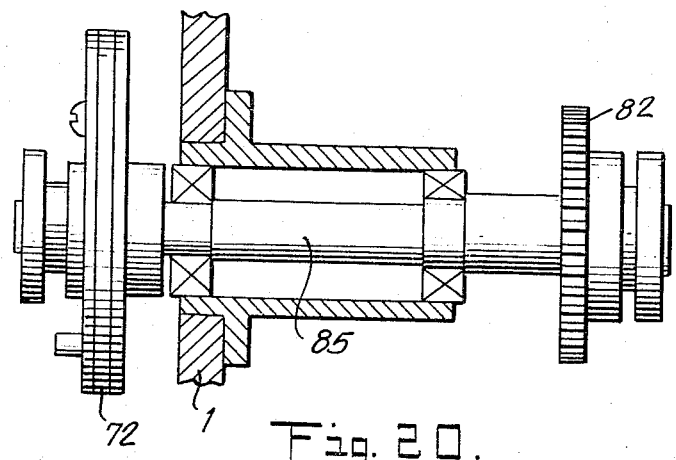

The new stretch cloth feeder is illustrated by the accompanying drawings in which:

FIG. 1 is a side view as the feeder is oriented when the books are fed from left to right;
FIG. 2 is a top view of FIG. 1;
FIG. 3 is a vertical section taken on the line 3—3 in FIG. 4;
FIG. 4 is a horizontal section taken on the line 4—4 in FIG. 3;
FIG. 5 is a vertical section taken on the line 5—5 in FIG. 2;
FIG. 6 is a horizontal section taken on the line 6—6 in FIG. 5;
FIG. 7 is a transverse section taken on the line 7—7 in FIG. 5;
FIG. 8 corresponds to FIG. 7 but is taken on the line 8—8 in FIG. 5;
FIG. 9 is a portion taken from FIG. 1 on an enlarged scale and with details exposed;
FIG. 10 is a transverse section taken on the line 10—10 in FIG. 9;
FIG. 11 is a transverse section taken on the line 11—11 in FIG. 9;
FIG. 12 is a vertical section taken on the line 12—12 in FIG. 11;
FIG. 13 is a transverse section taken on the line 13—13 in FIG. 9;
FIG. 14 is a top view taken on the line 14—14 in FIG. 9;
FIG. 15 is a vertical section of details in FIG. 1, shown on an enlarged scale;
FIG. 16 is a transverse section taken on the line 16—16 in FIG. 1;
FIG. 17 is a side view showing on an enlarged scale details in FIG. 1;
FIG. 18 is a transverse section taken on the line 18—18 in FIG. 17;
FIG. 19 is a side view showing on an enlarged scale and exposed details in FIG. 17;
FIG. 20 is a transverse section taken on the line 20—20 in FIG. 19;
FIG. 21 is a timing chart; and
FIG. 22 is a schematic electric circuit for controlling the feeder.

The general mechanical construction of this new stretch cloth feeder is described below first, and the control features, mechanical and electrical are described thereafter.

The feeder is built around a plate 1 pivotally mounted in a vertical plane by horizontal shafts 2 and 3. These shafts extend backwardly from the plate 1 and are mounted by a suitable support 4 so that the stretch cloth feeder is located below the path of travel of the books carried along by the traveling series of book clamps.

A single book clamp 5 is illustrated in FIG. 1 carrying along a book 6 with its back downwardly so that the appropriate length of stretch cloth may be applied. This clamp is only one of a long series of interconnected clamps that travel along continuously, each usually carrying a book but possibly not. When coming from a binder there is always a chance that one or more clamps may come along empty.

A supply roll R of the stretch cloth strip 7 is carried by a horizontal spindle 8 mounted by the plate 1. This spindle 8 is located at the right hand end of the plate. This spindle 8 is arranged for ready replacement of the roll R of stretch cloth 7 when required and on the front side of this roll the spindle nonrotatively mounts a vertical retainer plate 9 adapted for quick removal for stretch cloth roll replacement and on its inside mounting spring biased plates 10 which press against the side of the roll R to provide frictional restraint preventing unrestrained roll rotation.

As shown by FIGS. 1 and 2, the stretch cloth strip 7 feeds from the roll over various guides 11 going towards the left, as seen in FIG. 1, the strip 7 then continuing to the left at a downward angle through feed rolls 12 and 13 and rotary cutting blade 14 which works against a lower fixed blade 15 shown in FIG. 15. Control of the feed roll speed provides predetermined lengths of cut strip.

Each cut length is fed to the periphery of a vacuum drum 16 having a perforated cylindrical periphery and which is provided with means for sucking through its periphery excepting when release of a cut strip length is necessary. This drum rotates to carry each cut length past a glue roll 17 which applies an appropriate adhesive to each length, which is then fed by this drum 16 to the one of the books 6 above it as this book is carried over its top by one of the book clamps. The diameter of the drum 16 is such that with proper timing it carries two of the cut lengths at a time, rotating a half turn for each two passing book clamps.

If any one of the book clamps fails to contain a book, it is necessary to stop the feeding and cutting of the strip. Thereafter it is necessary to restart everything as the first of the book clamps containing books registers with the drum. The travel of the book clamps at high velocity requires that the feeder operate at a correspondingly high speed.

Ordinarily, in advance of equipment of this type there will be an electric switch that is either mechanical, photoelectric or the like, and which is actuated whenever an empty book clamp approaches the stretch cloth feeder. Although not illustrated, it is to be understood that such a switch is contemplated in the case of the present invention and that the signal it provides will be used to control the feeder.

The elements described above are mounted to project horizontally from the front side of the plate 1 as shown in FIG. 1. This plate can pivot about the shaft 2 and, although not shown, the shaft 3 may have an eccentric mounting for the plate 1 so that by rotation of the appropriate parts the lefthand end of the plate may be swung up and down as required to locate the periphery of the drum 16 into pressing engagement with the back of each passing book. Each strip length is secured to each book back because of the adhesive applied by the glue roll 17.

The back side of the plate 1 mounts a gear box 18, the series of clamps, of which only the one 5 is shown, are driven by mechanical elements as usual, and the feeder can be timed mechanically to the traveling clamp series. This timing is effected by appropriate integearing (not shown) with a gear 19 which on the outside of the gear box 18 meshes with a gear 20 keyed to a horizontal combination power input and cam shaft 21 transversely journaled horizontally by the plate 1 and gear box 18.

Within the gear box this cam shaft 21 mounts three cams C1, C2 and C3. Adjacent to these cams the gear box mounts a rocker shaft 22 which, as shown by FIG. 7, journals three rockers 23, 24 and 25. Each cam and its rocker is generally similar and the arrangement of each may be understood from FIG. 5, where the cam C2 and the rocker 24 are shown. Here, the rocker 24 has a cam follower 24a bearing against the cam C2 because the rocker is urged towards the cam by a compression spring 24b. The corresponding other two followers are shown at 23a and 25a in FIG. 7. As the cams rotate, the rockers rock back and forth reciprocatively.

Each rocker 23 to 25 has a radial slot 23c, 24c and 25c respectively. A shaft 30 mounts three levers 27, 28 and 29, one for each rocker, and these levers each have rollers 27a, 28a and 29a respectively riding in the slots 23c, 24c and 25c. Therefore, rocking of the rockers by the cams rocks these three levers. Each is rotatively journaled by the shaft 30 and is therefore independent with respect to the others and each is dependent on its cam.

Each of the above levers is like a bell crank, their other arms forming gear segments of which only the one 28b is shown, for which see FIG. 5. The three levers are all journaled on the shaft 30.

All three levers are associated with mutually similar gear trains and the following description relating to the lever 28 serves to describe the others.

This lever 28 forms a bell crank arrangement with a gear segment 28b, this bell crank arrangement rocking on a shaft 30 which is common to all three rocker arrangements. This shaft 30 rides in slots 31 formed in the plate 1 and the opposite side of the gear box 18, and its location with respect to the shaft 22 may be varied because its opposite ends are supported by mountings 32 adjustably located by screws 33 which screw through pivoting mountings 34, the latter being fixed against displacement with respect to the frame plate 1 and the back plate of the gear box 18.

The screws 33 may be rotated synchronously through right angle gearing 34a by a shaft 35 common to both of these gearings. The shaft 30 is tubular and the shaft 35 is located inside of this shaft 30. In this way, the throw or reciprocation limits of the various gear segments associated with the three rockers may be varied by varying the location of the shaft 30 with respect to the shaft 22.

Referring again to FIG. 5 where the rocker 28 and gear segment 28b are shown to exemplify the arrangement of the other two systems, in each instance as here the gear segment, in this instance 28b, reciprocates a pinion 36 meshing with a gear 37 which in turn meshes with a pinion 38.

FIG. 13 shows this pinion 38 and the pinions 38a and 38b for the other two rocker and gear systems associated with the other two cams but not shown. Each pinion is associated with an overrunning clutch shown at 40, 41 and 42, which are all identical, and which drive a shaft 43. The overrunning clutches are conventional and may be made as described in the McGraw-Hill Encyclopedia of Science and Technology, published by McGraw-Hill Book Company Inc., volume 3, p. 225, with their working elements oriented so that as the cams rotate to rock the rockers, through the elements described, the shaft 43 is rotated in one direction only.

It is to be understood that in the usual fashion and in each instance one of the rotative elements of each of the clutches 40, 41 and 42, is fixed to the pinions 38a, 38 and 38b, respectively, and that in each instance the other rotative element of the clutch is fixed to the shaft 43. Therefore, in each instance when the pinion rotatively reciprocates, the overrunning clutch acts like a ratchet-and-pawl combination to effect unidirectional rotation of the shaft 43.

The rotary cams are contoured to impart co-operatively a continuous rotation to the shaft 43 at a constant rotative speed by operation of the above elements. As shown by FIG. 13, this shaft 43 through gears 46, shaft 47 and gears 48 drive a shaft 49, shown by FIG. 10, on which the cloth strip feed roll 12 is keyed. The upper roll 13 which presses the cloth against the roll 12 is geared to the latter through gears 50. This upper roll 13 is journaled by a bell crank 51, the upstanding arm of which forms with an elastically compressible link connection 52 a toggle arrangement, whereby during threading up of the feeder the feed roll 13 may be moved and held upwardly with a gear train 50 separating as required. The upper feed roll goes downwardly and presses against the lower feed roll when the toggle arrangement is broken upwardly, the compressible link connection 52 then applying pressure to force the feed roll 13 downwardly on the lower roll 12.

For each revolution of the cam shaft 21 which is timed with the travel of the book clamps, the feed rolls 12 and 13 feed the stretch cloth in the direction of the oncoming books a length determined by the cam contours and adjustable through rotation of the shaft 35 to vary the location of the shaft 30 and therefore the effective throw of the various levers 27, 28 and 29.

The various rockers rocked by the various cams are not rocked simultaneously or with the same motions, because the cam contours are not the same.

Referring now to the cloth cutoff equipment, FIG. 15 shows that the rotary cutting blade 14 is mounted on a shaft 53 journaled by the plate 1 and, as shown by FIG. 4, driven through a sprocket wheel and chain drive 54 by the cam shaft 21. The lower cutting blade 15 is pivotally mounted on a short stub shaft 55, and is biased to its operative position against an abutment 56 by a compression spring 57.

The cut lengths of cloth strip are carried from the blades 14 and 15 by lower feed rolls 58 and upper feed rolls 59. The lower feed rolls are driven through gears 60 keyed to a shaft 61, shown by FIG. 4 as connected by gears 62 with the shaft 53. These feed rolls 58 and 59 work in a space formed through a short transfer table 63 which carries the cut lengths to the perforated periphery of the suction drum 16.

As the drum 16 rotates carrying each cloth length, the glue roll 17 applies the adhesive, ordinarily not glue literally, to the exposed surface of the cloth so that when the drum presses the cloth length against the back of a passing book the cloth adheres to the book's back.

The above requires the glue roll 17 to move reciprocatively to and from working position so that it will not apply adhesive to the periphery of the drum not occupied by the cloth length, and the manner in which this is done is shown by FIGS. 17 through 20 as explained below.

This glue roll 17 is rotatively mounted on the end of a lever 64 which swings about a shaft 65 on which an adhesive transfer roll 66 is mounted with its periphery in contact with the glue roll 17 to transfer adhesive thereto. The adhesive is contained in a glue pan 67 supported by two levers 68 so that it may be swung up and down to either expose the roll 66, as when cleaning or the like is required, this being shown by FIG. 17, or swung to an upward position where the roll 66 is immersed in liquid adhesive in the pan, as shown by FIG. 1.

The lever 64 is in the form of a bell crank having a short arm 64a, beyond the shaft 65, to which a swinging link 69 is pivoted by a connection 70, the lower end of this link having a cam follower 71 bearing on a rotary cam 72. This cam 72 is formed by sections, as shown by FIG. 20, and is of the type permitting the arcuate extent of its riser to be adjusted as required by the lengths of the cloth being handled. A compression spring 73 on a rod 74 connecting with the link 69 by a connection 75, urges the link 69 towards the cam 72. The other end of the spring 73 is held by a bracket 76 having a hole through which the rod 74 slides. In addition, the link 69 is urged towards the cam 72 by a compression spring 77 on a rod 78 connected to the link 69 by a connection 79. The other end of the spring 77 is held by a movable bracket 80 having a hole through which the rod 78 slides, this bracket 80 being held against movement away from the link 69 by a latch 81.

With the above arrangement, as long as the latch 81 holds the bracket 80, rotation of the cam 72 swings the lever 64 to move the glue roll 17 to and from the periphery of the drum 16. When the latch 81 unlatches, the link 69 swings back and forth about the pivot connection 70 without moving the glue roll 17 towards the periphery of the drum.

A sprocket wheel and chain drive 82 powers a shaft 83 on which the drum 16 is keyed, and also the shaft 65. Gears 84 interconnect the rolls 66 and 17. The cam 72 is driven by a shaft 85 driven by the sprocket wheel and chain drive 82.

A doctor blade 86 controls the glue layer on the roll 66. Various guides G are used at appropriate locations. The drum 16 has a blade arrangement 16a for keeping its periphery clean from contamination. These details do not require elaborate explanations.

The various control elements and their electrical control circuit are as follows:

Each of the rockers 23 through 25 is provided with a latch 101 through 103 as shown by FIG. 8, so that when at their reciprocating limits away from the various cams C1 through C3, the rockers can be latched against continued rocking action. These latches are moved to latching and unlatching position by a latch solenoid 104. To permit unlatching there must be enough play for the rockers to rock slightly as the high points on their respective cams engage their respective followers, and this slight rocking would impart a slow rotation to the shaft 43. To prevent this, the shaft 43 connects with the gears 46 through an electric solenoid operated clutch 105, show by FIG. 13, and the cloth feed roll shaft 49 is provided with a brake 106.

The cam shaft 21 carries two cams 108 and 109 which respectively actuate normally closed limit switches S1 and S2. A normally open limit switch S3 is actuated by the rocker 23 of cam C1. These arrangements are shown by FIGS. 4 and 7.

In addition, the cam shaft 21 through a sprocket wheel and chain drive 110 drives a cam shaft 111 as shown by FIG. 5, and as shown by FIG. 6, this cam shaft mounts three cams 112, 113 and 114 respectively operating limit switches S4, S5 and S6. S4 and S6 are normally open and S5 is normally closed.

The lower knife 15 is swung to its inoperative position by means of solenoid 115 as shown by FIG. 15, and the latch 81, for control of the glue roll 17, is actuated by a solenoid 116.

As previously explained, the control circuit shown by FIG. 22 receives its signal from a missing book indicator device of suitable type, and the feeding, cutting and applying of the stretch cloth lengths must be stopped while the missing book clamp passes. Usually an electric eye gives such a signal, as indicated in FIG. 22.

Referring now to FIGS. 21 and 22 in particular, the electric eye switch when closed by a missing book energizes relay solenoid 37R. At about 130° on the timing chart switch S6 is closed by its cam 114 to energize relay solenoid 38R. The latter closes its normally open contact 38C, energizes the latch solenoid 104 which pulls up all three latches 101 through 103 to the position indicated by FIG. 5 in the case of latch 102. Therefore, each of the rockers 23 through 25 will latch out of operation when moved forwardly to its limit by the highest point of its associated cam.

Cams C2 and C3 reach their high points at 220° as shown by the timing chart and their respective rockers therefore latch out. Note that cam C1 continues to feed the cloth at a constant velocity. Switch S1 is opened at 250° on the timing chart, by its cam 108, but without effect at this time. Switch S2 is opened at 310° of the timing chart, by action of its cam 109, de-energizing the relay solenoid 37R and at the same time switch S4 is closed by action of the cam 112 but without effect at this time. At 340° of the timing chart switch S5 opens, by action of its cam 113, but without effect at this time.

Up to this time, the cloth feed has continued at its normal constant rate under the drive of the cam C1. At 360° of the timing chart the knife 14 cuts off the last length of stretch cloth to meet the book in the oncoming clamp immediately in front of the clamp from which the book is missing. This length, like the preceding lengths, has an accurately measured length dependent on the setting or location of the shaft 30.

The electric eye detects the missing book clamp before the latter reaches the feeder and the cams C1, C2 and C3 turn to effect a number of cycles while stopping and starting. Thus, the timing chart of FIG. 21 may be referred to repeatedly for the action of these cycles.

At 60° of the second cycle of the timing chart switch S3, shown in FIG. 7, is closed by the rocker 23 as the cam C1 moves it to its fully advanced position. This switch S3 is held closed until the rocker 23 is unlatched and leaves its fully advanced position where it was moved by the cam C1. Closing of the switch S3 energizes relay solenoid 39R which closes normally open contacts 39C and energizes the lower knife solenoid 115 to prevent rotation of the rotary blade 14 from cutting the cloth. The relay solenoid 39R also opens the normally closed contacts 39C' to de-energize the clutch solenoid of the electric clutch 105, thus disconnecting the shaft 43 positively from the gears 46. Although not shown by the wiring diagram, the brake solenoid 107 is simultaneously actuated to provide a positive feed stopping.

Deactivation of the knife is necessary because a short length of the strip cloth has by now been fed slightly past the knife and should not be cut at this time.

At 90° of the second cycle, the rocker 23 latches out so that all cam action is deactivated.

Reference to the timing chart shows that the stretch cloth displacement produced by cam C1 is at a substantially constant velocity up to 360° of the first cycle and that throughout the second cycle there is a constant controlled deceleration up to 60° where switch S3 is closed. The degree of this deceleration depends on the cam contour and can be made gradual enough in a very short interval of time to let the cloth feed stop smoothly and without risk of overrunning action. With this smoothly slowing stop, the pressure plate 10 which brakes the roll of stretch cloth 7 can operate effectively to prevent overrunning. The stop must be rapid enough to meet the demand of high speed operation yet smooth enough to prevent overrunning. In addition, all of the relatively heavy parts of the machine which must stop, correspondingly decelerate to provide a cushion stoppage free from heavy shock.

At 130° of the second cycle of the cams' rotation, another missing book would cause relay solenoid 37R to be reenergized so that the feeder would not go back into operation. In this manner, any number of empty book clamps may pass without operation of the feeder.

As the first clamp comes along containing a book, relay solenoid 37R is not energized and, therefore, its normally open contacts 37C remain open.

With relay solenoid 37R de-energized, at 250° of the second cycle, the switch C1 through the action of its cam 109 opens to open the circuit to the relay solenoid 38R which in turn permits its normally open contacts 38C to open and de-energize the latch solenoid 104 leaving all of the latches 101 through 103 free to unlatch when their frictional grip by their respective rockers ease as each rocker is rocked slightly by being moved by the highest point of its associated cam. The solenoid of the electric clutch 105 is again energized and the solenoid 107 is deactivated to release the brake 106.

At 300° of the second cycle, cam C3 has reached its high point and its latch 103, therefore, releases. As can be seen from the timing chart, cam C3 this time is causing its rocker 25 to move backwardly and because of the action of the overrunning clutch 42 no feeding action is taking place.

At 310° of the second cycle, the cam 112 closes the normally open switch S4 to energize the relay solenoid 40R, its normally open contacts 40C re-energizing the glue solenoid 116 to unlatch the latch 81 and hold the glue roll 17 retracted when it has finished applying adhesive to the last length of stretch cloth on the suction drum. Switch S2 also opens at this time without effect.

At 340°, second cycle, normally closed switch S5 is opened by operation of its cam 113 without effect at this time.

At 360° of the second cycle, cam C3 through the action of its rocker and the various elements and the overrunning clutch 42, starts to rotate the shaft 43 and consequently to impart rotation to the feed rolls 12 and 13.

At this point it should be remembered that as shown by the upper righthand corner of the timing chart, cam C1 when effecting its decelerating action has fed a length of cloth partially forwardly and partially through the cutoff knife blades.

With the above in mind, at 360° of the second cycle, starting now into the third cycle, cam C3 through its associated rocker and other elements previously described starts to feed the stretch cloth ahead. Since the stretch cloth is already partially fed the timing chart starts off at 360° of the second cycle, now 0° of the third cycle with the cloth already showing displacement.

As cam C3 starts the feeding action its contour is such as to gradually accelerate the feed from a standstill to full velocity as can be seen from the ascending portion of the cam C3 curve on the timing chart. In this way, the desired smoothly accelerating restarting feed of the stretch cloth is effected. There is no shock or jar such as might break the stretch cloth. Correspondingly, the various heavy parts are restarted smoothly.

At 90° of the third cycle, cam C1 has reached its high point and released its rocker from its latch so that the rocker 23 permits the normally open switch S3 to open, de-energizing relay solenoid 39R which through its contacts 39C open and de-energize the knife solenoid 115 so that the lower knife blade 15 returns to its position for cutting co-operation with the rotary blade 14. At the same time, contacts 39C open the holding circuit to relay solenoid 40R.

At 130° of the third cycle, if the electric eye has sent a signal due to a missing book, switch S6 would reclose and start the holding circuit again. If there is no missing book nothing happens.

At 180° of the third cycle, cam C1 through its associated parts picks up the forward feeding of the stretch cloth which is now moving at uniform velocity under the action of cam C3, thus permitting cam C3 to allow its rocker 25 to start its return or backward sroke without loss of feeding velocity.

At 220° of the third cycle cam C2 reaches its high point and unlatches rocker 25.

At 250° of the third cycle, the cam operated switch S1 opens without effect; at 310° of the third cycle cam operated switch S4 closes without effect and cam operated switch S2 opens without effect.

At 340° of the third cycle cam operated switch S5 opens through the action of its cam 113, this de-energizing relay solenoid 40R which, through its contacts 40C de-energizes the solenoid 116 so that the glue roll latch 81 returns to its latching position, stops the motion of the movable bracket 80 and permits the glue roll 17 to again reciprocate under the control of the cam 72. The timing is such that the glue roll 17 goes into operation as the first restarted length of stretch cloth comes to an opposite position and is ready to receive the adhesive.

At 360° of the third cycle, cam C2 takes over the movement of the stretch cloth forwardly at the same uniform or constant velocity so that cam C1 can start its return stroke. Thus, the feeder is now in normal operation again.

What is claimed is:

1. In a machine for feeding lengths of material with decelerating and accelerating stops and starts, a power transmission comprising a plurality of accelerating and decelerating cams adapted to be moved by a power source, followers engaging said cams for reciprocative motion thereby, means for converting the motions of said followers to rotary motion, said cams being phased relative to each other to co-operatively provide a resultant continuous rotary motion through said converting means, means for deactivating said followers progressively so that the last deactivated one thereof provides a decelerating stopping motion through said converting means, and means for progressively reactivating said followers so that the first activated one thereof provides an accelerating starting motion through said converting means.

2. The machine of claim 1 in which said cams are continuously rotative and said deactivating means comprises latches for progressively latching said followers almost at their reciprocative limits from said cams while allowing slight reciprocative motion of the followers to permit unlatching action, a clutch, and rotary material feeding means driven by said reciprocative motion converting means through said clutch, whereby release of said clutch prevents said slight reciprocative motion from causing rotation of said feeding means while said followers are latched.

3. The machine of claim 2 and including intermittently active material cutting means for material fed by said feeding means, the latter feeding the material partly through said cutting means during its deceleration and stopping upon the latching of said followers, and means for deactivating said cutting means until a predetermined length of material is fed upon the accelerating starting motion of said feeding means.

4. A machine for feeding strip from a supply roll of the strip to articles carried by a continuously passing conveyor having interspaced article carrying holders any of which may be empty so as to require an interruption in the feeding of the strip thereto, said machine including at least one feed roll for feeding the strip from the supply roll, a plurality of continuously rotating cams, a pivotally mounted reciprocative follower for each of said cams and rotatively reciprocatingly actuated by the latter, an overrunning clutch for each of said followers for converting its rotatively reciprocative motion to unidirectional rotary motion, a common shaft rotatively driven by said clutches and connected to rotate said feed roll, said cams being accelerating and decelerating cams and phased to provide a resulting continuous rotation to said common shaft, and means activated by an empty holder for progressively latching said followers substantially at the limits of their reciprocation away from said cams so that the last latched follower provides a deceleration to said feed roll when stopping, and means activated by an article-carrying holder for progressively unlatching said followers so that the first unlatched follower provides an acceleration to said feed roll when starting.

5. The machine of claim 4 in which said followers are latched at positions causing said cams to rock them slightly to permit their unlatching, and a clutch between said common shaft and said feed rolls, and means for releasing said clutch while said followers are latched.

6. The machine of claim 4 in which said strip is fed as cut lengths and includes intermittently acting cutting means to which the strip is fed by said feed rolls, said latching of said followers causing the strip to feed partly through said cuting means while stopping, and means for deactivating said cuting means upon restarting of said rocker action until a predetermined length of said strip is fed therethrough.

7. A machine for feeding lengths of strip to the backs of books conveyed continuously by a series of book clamps holding the books with their backs downwardly and of which one or more may be empty so as to require an interruption in this feeding, said machine being adapted to be positioned opposite to the backs of books carried by said clamps and including means for rotatively mounting a strip supply roll, at least one feed roll for feeding the strip from said roll, rotary cutting means for cutting into lengths the strip fed by said feed roll, means for transferring the cut lengths to the backs of books carried by the book clamps, a plurality of powered means each applying accelerating and decelerating rotary motion phases to said feed roll phased to co-operatively provide a resulting continuous rotary motion thereto, and means actuated by an empty book clamp for progressively deactivating said powered means so that the last one deactivated is in its decelerating phase, and means responsive to a clamp carrying a book for activating said powered means progressively starting with one in its accelerating phase.

8. The machine of claim 7 in which said powered means comprises a plurality of accelerating and decelerating rotary cams, follower rockers for said cams, an overrunning clutch for each of said rockers and a common shaft turned by said clutches and connected to drive said feed roll, said deactivating and activating means comprising latches for latching and releasing said rockers so that the latter are held substantially at the limits of their reciprocation from said cams when latched.

9. The machine of claim 8 having means for driving said rotary cutting means continuously and means for deactivating said cutting means when said rockers are latched.

10. The machine of claim 9 having means for applying adhesive to the cut lengths while they are being transferred by said transferring means and means for deactivating said adhesive applying means when the cut lengths are missing due to said latching.

References Cited
UNITED STATES PATENTS 2,646,104   7/1953   Hawkes _____ 156—354

EARL M. BERGERT, *Primary Examiner.*

T. R. SAVOIE, *Assistant Examiner.*